Patented Oct. 9, 1951

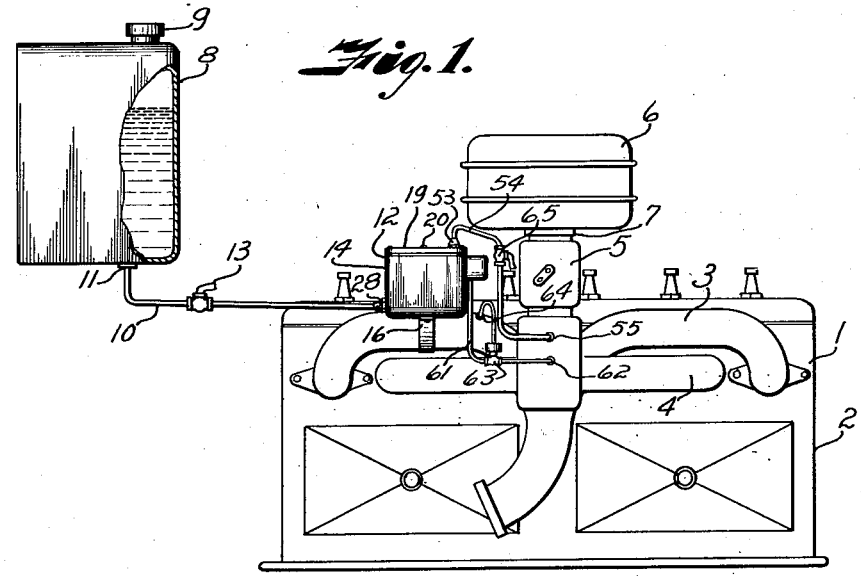
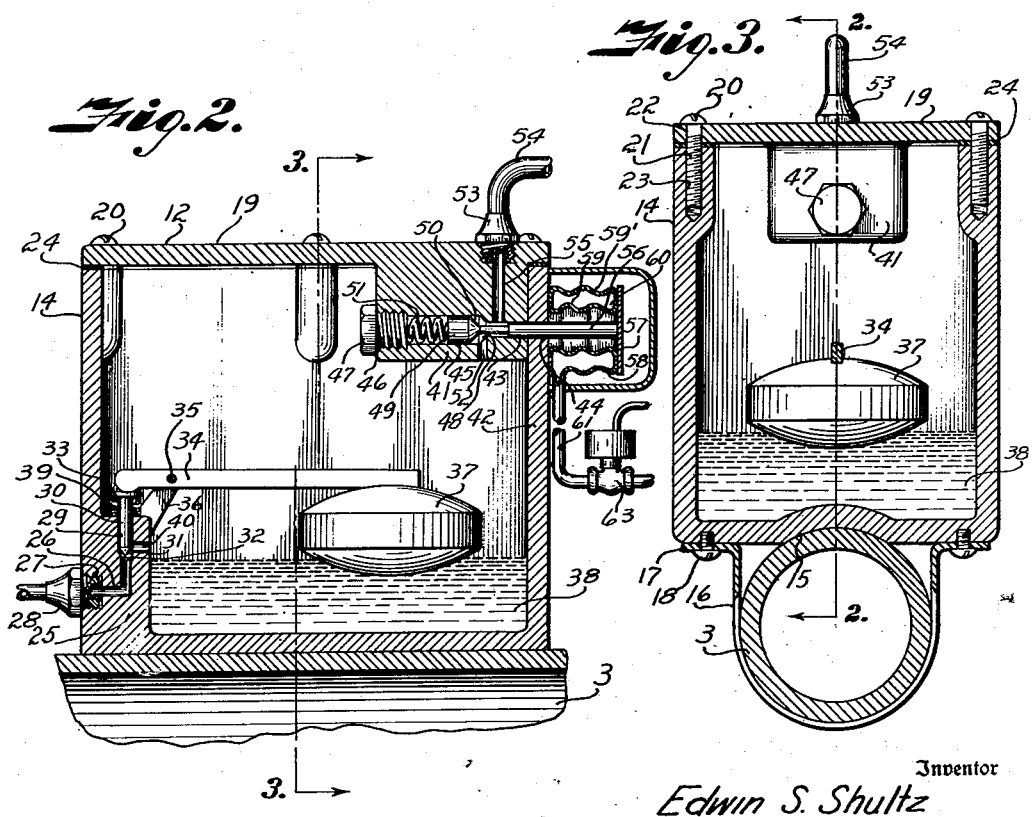

2,570,394

UNITED STATES PATENT OFFICE 2,570,394

STEAM INDUCTION DEVICE FOR MANIFOLDS

Edwin S. Shultz, Kansas City, Mo.

Application February 23, 1949, Serial No. 77,787

7 Claims. (Cl. 123—25)

1

This invention relates to vaporizers for internal combustion engines and more particularly to an attachment controlled by operation of the engine for vaporizing water and discharging the vapor or steam into the intake manifold.

The objects of the invention are to provide an attachment wherein a supply of water is fed to an exhaust heated chamber and vaporized then discharged into the intake manifold of the engine when said engine is running; to provide a float controlled feed of water to the heating chamber; to provide automatic valve means for permitting discharge of vapor to the manifold only when the engine is operating; to provide a thermostatically controlled valve for rendering the automatic valve means inactive when the exhaust manifold is below a predetermined temperature; to provide controlled discharge of water vapor into the intake manifold of an internal combustion engine wherein the water is vaporized in an exhaust heated chamber and discharged into said manifold only when the engine is operating and above a predetermined temperature; and to provide a simple, durable and comparatively inexpensive attachment for delivery of water vapor to the engine and controls therefor preventing delivery of vapor to the engine when said engine is not operating.

In accomplishing these and other objects of the present invention, I have provided improved details of structure, the preferred forms of which are illustrated in the accompanying drawings, wherein:

Fig. 1 is a side elevation of an internal combustion engine with the vaporizer and controls applied thereto.

Fig. 2 is a vertical sectional view through the exhaust heated chamber on the line 2—2, Fig. 3.

Fig. 3 is a vertical sectional view through the exhaust heating chamber on the line 3—3, Fig. 2.

Referring more in detail to the drawings:

1 designates generally an internal combustion engine of any suitable type which includes a block 2, an exhaust manifold 3, an intake manifold 4, a suitable type of carburetor 5, and an air cleaner 6 mounted on the intake 7 of said carburetor. As in conventional practice the carburetor is connected to the intake manifold whereby gasoline or other fuel enters the carburetor and is mixed with air in the well known manner and drawn by the suction of the engine from the carburetor through the intake manifold to the cylinders of said engine.

While a downdraft carburetor is shown, any other conventional type of engine and carburetor therefor may be used as the invention comprises the attachment and controls for vaporizing water and discharging same into the intake manifold of an engine. Said attachment consists of a water tank 8 adapted to be mounted on the dash or in other suitable positions adjacent the engine. The tank 8 is preferably mounted with a vented fill cap 9 whereby water may be applied to the tank and when the cap is on the tank air will pass through the vent to replace water flowing from said tank through a conduit 10 such as a flexible tube which is connected to the bottom of the tank 8 as at 11, said tube having communication with the interior of said tank. The tank 8 is of such elevation as to permit gravity flow of water through the tube 10 to an exhaust heating chamber 12, said tube being provided with a valve 13 for controlling flow of water therethrough.

The heating chamber 12 includes a body portion 14 made of metal and having a portion of its bottom curved as at 15 to rest on and conform to the contour of the exhaust manifold 3, said body member being secured to the manifold with a suitable fastening device such as a strap 16 extending under the exhaust manifold and terminating in ears 17 suitably secured to the bottom of the chamber as by screws 18. The heating chamber includes a cover plate 19 which is secured to the body portion by screws 20 having threaded shanks 21 extending through apertures 22 in the cover plate and threaded into threaded bores 23 in the body member, a gasket 24 being disposed between the cover plate and the body member to form a seal therebetween. Adjacent the lower end of the body is a boss 25 having an inlet port 26 communicating with a screw-threaded counterbore 27 adapted to receive a fitting 28 on the end of the tube 10 to form the connection therefor.

At the inner end of the port 26 is a counterbore 29 slidably mounting a valve 30 having a tapered end 31 adapted to engage a seat 32 to close the port, the opposite end of said valve having a collar 33 engaged by a float-operated lever 34 pivotally mounted on a pin 35 carried by a bracket 36 extending from the boss 25. A float 37 is connected to the lever 34 in spaced relation to the pin 35 whereby buoyancy of the float in response to raising of the level of the water 38 in the chamber pivots the lever 34 to move the tapered portion of the valve into engagement with the seat 32 and close the port 26. A spring 39 sleeved on the valve stem between the boss 25 and the collar 33 urges the valve to open position as the lever 34 moves away from the valve when the water level recedes in the chamber. An aperture 40 provides communication between the counterbore 29 adjacent the seat 32 and the interior of the chamber for flow of water through the passage to the port 26 and into the chamber when the valve 30 is in unseated condition.

The cover plate 19 is provided with a depending portion 41 preferably engaging the wall 42 of the chamber. The depending portion and the wall 42 are provided with aligned bores 43 and 44 respectively. Coaxial with the bore 43 is a counterbore 45, the open end 46 of which is closed by a threaded plug 47. Said counterbore terminates in a tapered seat 48 spaced from the wall 42. Slidably mounted in the counterbore is a valve 49 having a tapered end 50 adapted to seat on a tapered seat 48. A spring 51 is located between the plug and the valve urging the valve into seating engagement with the seat 48. A port 52 provides communication from the interior of the chamber to the counterbore adjacent the seat 48. Secured to the cover plate 19 as by being threaded into the bore is a fitting 53 on the end of a tube 54, the other end of said tube being connected to the intake manifold as at 55 adjacent the outlet end of the carburetor 5, a passage 55 providing communication between the tube 54 and the bore 43 adjacent the seat 48 whereby when the valve 49 is in unseated position, vapor may flow from the chamber through the port 52, bore 43, passage 55, tube 54 to the manifold.

In order to move the valve 49 into open position a plunger 56 is slidably mounted in the bores 43 and 44, said plunger extending outwardly through the wall 41 of the chamber and having its outer end secured to a plate 57. Mounted between the plate and the wall 41 is a bellows 58 having inner and outer walls 59 and 59', the ends of said bellows being connected to the wall 41 and the plate 57. The bellows is preferably formed of relatively resilient thin metal and provides a circular chamber 60. Connected to the bellows and having communication with the chamber 60 is a tube 61, the other end of said tube being connected to the intake manifold as at 62 whereby when the engine is operating the suction caused by the pistons on the intake stroke form a vacuum which tends to collapse the bellows and thereby draw the plate 57 toward the wall 41 moving the plunger 56 toward the valve 49 forcing same from its seat. When the engine is not operating the pressure of the spring 51 forces the valve into closed position.

It is desirable to prevent the water vapors from passing into the intake manifold immediately after the engine is started or when the engine is cold. A thermostatic valve 63 is therefore placed in the tube 61, said valve being connected to the exhaust manifold as at 64 whereby the valve is responsive to the heat of said exhaust manifold and said valve will open when the manifold is heated to a predetermined temperature. This arrangement eliminates the possibility of condensation or water vapors being drawn into the engine while said engine is cold.

In the operation of this device, the valve 13 is generally open and water will flow from the tank 8 through the tube 10, port 26 and aperture 40 until the water level rises sufficiently whereby the buoyancy of the float 37 operating the lever 34 forces the valve 29 against the spring pressure into seating position to stop the flow of water into the chamber. When the engine is started and is cold the thermostatic valve 63 is in closed position rendering the vacuum in the manifold inoperative on the bellows 58. As the engine is operated the heat from the exhaust and the products of combustion in the exhaust manifold act to heat the bottom of the chamber and the water therein tending to vaporize said water. After the exhaust manifold reaches a predetermined temperature the valve 63 is opened and the suction in the manifold creates a vacuum in the chamber 60 of the bellows 58, moving the plate 57 toward the wall 41 and the plunger 56 toward the valve 49, forcing same against the pressure of the spring 51 and thereby moving the valve from seated condition, opening the port 52 whereby the vapors flow therethrough and through the passage 55, tube 54 to the intake manifold, mixing with the fuel and air passing therethrough. As water is vaporized in the chamber, the level of the water will recede and the float will allow the valve 30 to move to open position permitting additional water to flow into the chamber 12. When there is no vacuum in the chamber 60, the spring 51 will apply pressure to the valve 49 causing same to seat and close the passageway to the tube 54 whereby no vapors will be delivered to the intake manifold during the time that the engine is stopped. If the engine is started immediately before the engine has time to cool, the thermostat valve will remain open and vapors will be immediately delivered to the manifold.

When it is desired not to have any moisture enter the manifold, the valve 65 in the tube 54 may be closed. Also the valve 13 in the tube 10 may be closed, thereby rendering the apparatus entirely inoperative.

It is believed obvious that with this apparatus there is a gravity feed yet the controls are such that no water vapors will pass through the manifold until the engine is in condition to receive same.

What I claim and desire to secure by Letters Patent is:

1. A water vaporizer for internal combustion engines comprising, a reservoir adapted to be filled with water, a heating chamber positioned below the reservoir and adapted to be heated by an engine, means of communication between the reservoir and the heating chamber, a float disposed within the chamber and acting to retain the water in the chamber at a constant level, an outlet duct connecting the chamber above the water level with the intake manifold of the engine, a valve controlling passage through the duct, a spring urging the valve toward a passage closing position, and differential pressure responsive means having communication with the intake of the engine for controlling operation of the valve and acting only when the engine is above a predetermined temperature to move said valve to open the passage.

2. A water vaporizer for internal combustion engines comprising, a reservoir adapted to be filled with water, a heating chamber positioned below the reservoir and adapted to rest on an exhaust manifold of an engine, means of communication between the reservoir and heating chamber, a float disposed within the chamber and acting to retain the water in the chamber at a constant level, an outlet duct connecting the chamber above the water level with the intake manifold of the engine, a valve controlling passage through the duct, and means responsive to vacuum in the intake manifold and acting only when the engine is above a predetermined temperature to move said valve to open the passage.

3. A water vaporizer for internal combustion engines comprising, a reservoir adapted to be filled with water, a heating chamber positioned below the reservoir and adapted to rest on an exhaust manifold of an engine, means of communication between the reservoir and heating chamber for gravity flow of water to said chamber, a float disposed within the chamber and acting to retain the water in the chamber at a constant level, an outlet duct connecting the chamber above the water level with the intake manifold of the engine, a valve controlling passage through the duct, a spring urging the valve toward a passage closing position, and means responsive to vacuum in the intake manifold and acting only when the engine is above a predetermined temperature to move said valve to open the passage.

4. A water vaporizer for internal combustion engines comprising, a body having an interior chamber, means for mounting the body on and in engagement with the exhaust manifold of an engine for transfer of heat to said body, a water inlet to the chamber, a float disposed within the chamber and acting to retain the water in the chamber at a constant level, the chamber having an outlet duct above the water level for delivery of water vapor from the chamber to an intake manifold of the engine, a valve controlling passage to the outlet duct, a spring urging the valve toward a closed position, means responsive to vacuum in the intake manifold for opening the valve when the engine is operating, and a thermostatic means responsive to temperature of the exhaust manifold for rendering the vacuum responsive means inoperative whereby the valve remains closed when the exhaust manifold of the engine is below a predetermined temperature.

5. A water vaporizer for internal combustion engines comprising, a reservoir adapted to be filled with water, a body having an interior chamber, means for mounting the body on and in engagement with the exhaust manifold of an engine for transfer of heat to said body, said body being positioned below the reservoir, means communicating the reservoir with the body chamber for gravity flow of water to said chamber, a float disposed within the chamber and acting to retain water in the chamber at a constant level, the chamber having an outlet duct above the water level for delivery of water vapor from the chamber to an intake of an engine, a valve controlling passage through said outlet duct, a bellows, a duct communicating the bellows with the intake manifold of the engine whereby said bellows is responsive to vacuum in the intake manifold, and means movable by said bellows for moving the valve to control the passage through the outlet duct from the body chamber.

6. A water vaporizer for internal combustion engines comprising, a reservoir adapted to be filled with water, a body having an interior chamber, means for mounting the body on an engine for transfer of heat to said body, said body being positioned below the reservoir, means communicating the reservoir with the body chamber for gravity flow of water to said chamber, a float disposed within the chamber and acting to retain water in the chamber at a constant level, the chamber having an outlet duct above the water level for delivery of water vapor from the chamber to an intake manifold of an engine, a valve controlling passage through said outlet duct, a spring urging the valve toward a closed position, a bellows, a duct communicating the bellows with the intake manifold of the engine whereby said bellows is responsive to vacuum in the intake manifold, a thermostatic means to interrupt communication between the bellows and the intake manifold when the engine is below a predetermined temperature, and means movable by said bellows for moving the valve to control the passage through the outlet duct from the body chamber.

7. A water vaporizer for internal combustion engines comprising, a reservoir adapted to be filled with water, a body having an interior chamber, means for mounting the body on and in engagement with the exhaust manifold of an engine for transfer of heat to said body, said body being positioned below the reservoir, means communicating the reservoir with the body chamber for gravity flow of water to said chamber, a float disposed within the chamber and acting to retain water in the chamber at a constant level, the chamber having an outlet duct above the water level for delivery of water vapor from the chamber to an intake manifold of an engine, a valve controlling passage through said outlet duct, a spring urging the valve toward a closed position, a bellows, a duct communicating the bellows with the intake manifold of the engine whereby said bellows is responsive to vacuum in the intake manifold, a thermostatic means responsive to temperature of the exhaust manifold to interrupt communication between the bellows and the intake manifold when the exhaust manifold of the engine is below a predetermined temperature, and means movable by said bellows for moving the valve to control the passage through the outlet duct from the body chamber.

EDWIN S. SHULTZ.

REFERENCES CITED

The following references are of record in the file of this patent:

UNITED STATES PATENTS

| Number | Name | Date |
| --- | --- | --- |
| 1,728,916 | Bone | Sept. 24, 1929 |
| 1,730,089 | Nimrick et al. | Oct. 1, 1929 |
| 1,781,356 | West | Nov. 11, 1930 |
| 1,941,761 | Roth | Jan. 2, 1934 |